Oct. 17, 1967    F. J. ADAMS ET AL    3,347,109
STEERING MECHANISM
Filed Sept. 27, 1965    3 Sheets-Sheet 1

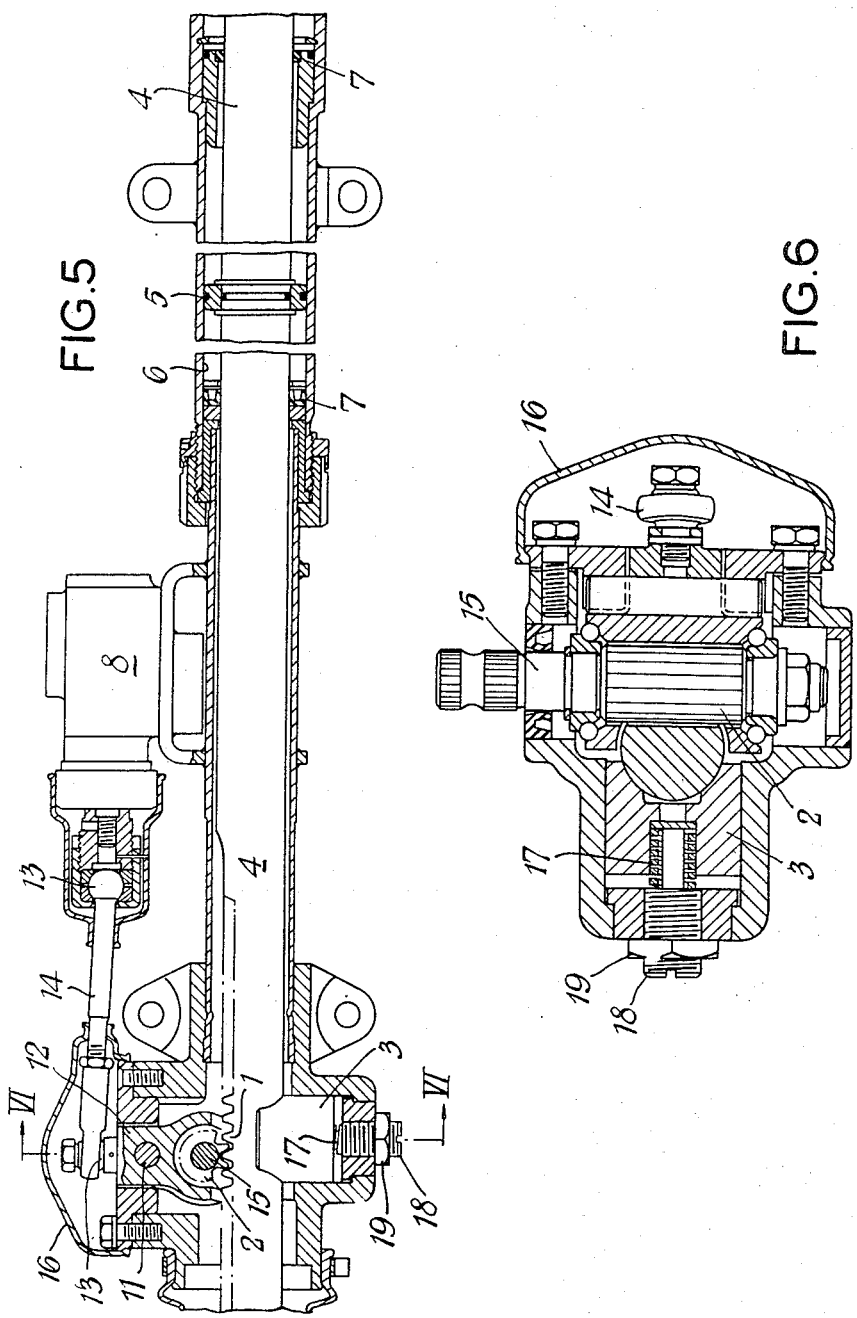

United States Patent Office 3,347,109
Patented Oct. 17, 1967

3,347,109
STEERING MECHANISM
Frederick John Adams, Campton, near Shefford, and Howard Kenneth Alderton, Luton, England, assignors to Hydrosteer Limited, Luton, England, a British company
Filed Sept. 27, 1965, Ser. No. 490,394
7 Claims. (Cl. 74—388)

ABSTRACT OF THE DISCLOSURE

Steering mechanism of the rack and pinion kind in which the reaction between the rack and the pinion is used to operate a valve for controlling hydraulic power assistance to the steering. The reaction is harnessed by carrying the pinion shaft in a rocking lever, the lever being connected to the valve so that its rocking movement operates the valve.

---

This invention relates to power-assisted steering or like mechanism. It seeks to afford a simple and effective means, of a general kind known for example by United Kingdom specification No. 813,312, in which advantage can be derived by the proposed improvements.

In general, the invention relates to steering mechanism of the rack and pinion kind in which the reactions between the pinion and the rack result in the operation of valve means which in turn control the power assistance, usually hydraulic. In the specification above-mentioned the arrangement was based essentially on the use of a lever of the second or third kind. The pinion shaft was mounted rotatably in a support which acted as a lever the fulcrum of which was at one end, whilst the axis of the shaft swung (through a small dimension) so that either the support moved a control valve or an extension of the shaft itself did so.

In the present invention, the leverage employed is of the first kind; that is to say, the fulcrum is located between the shaft axis and an arm which actuates the valve. This is deemed to be advantageous in that it is easier and more economic to design and construct on this basis than on the lines of the previous proposal, and the various reactions and loads, and precision of construction, are more easily achieved.

According to the invention steering mechanism of the rack and pinion kind and in which the reaction between the pinion and the rack actuates a lever so as to operate valve means for controlling hydraulic power assistance to the steering is characterised in that one end of the lever actuates the valve means and the other end of the lever is actuated by the reaction between the pinion and the rack, the fulcrum of the lever lying between said lever ends.

According further to the invention, a rack-and-pinion mechanism has a conventional housing or box through which the rack slides, supported as by a saddle against separation from the pinion. The pinion shaft is borne in the forked end of a lever. Where this shaft passes into the box it is sealed, e.g. by a somewhat flexible gland, such as a cup-washer, of sufficient yield to permit the shaft a small movement in a transverse plane. The lever is pivotally borne in the wall of the box, on a pivot of which the axis is parallel to that of the shaft, the pivot being located on the side of the pinion remote from the rack. The lever has an arm which projects from the box, which arm is connected (e.g. by articulated rod) to the power-assist valve.

It follows that the lever is fulcrumed in the box at the pivot; force is applied to it by the pinion reacting on the rack; and the outside arm operates the valve.

The invention further includes a convenient embodiment of the foregoing in an actual steering mechanism.

Figure 1:
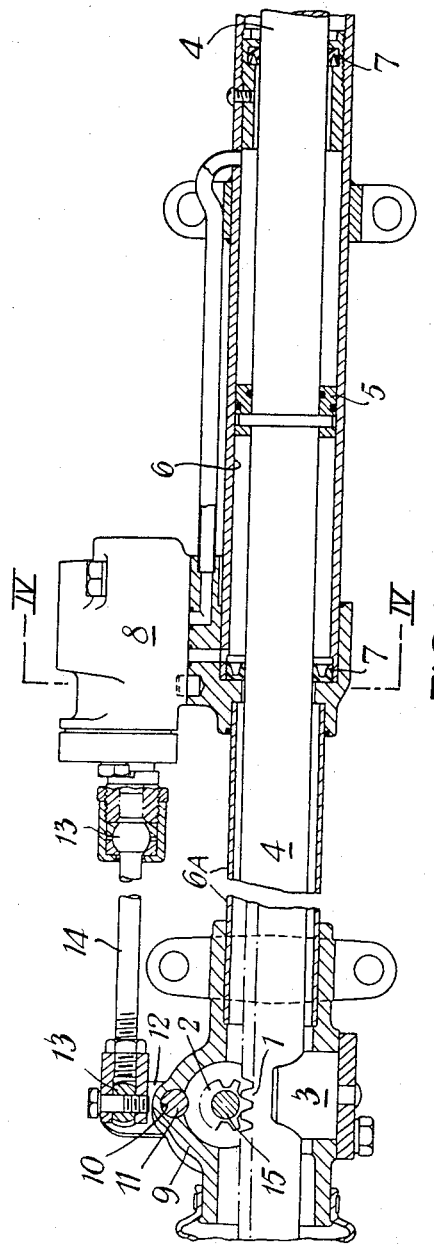
Figure 2:
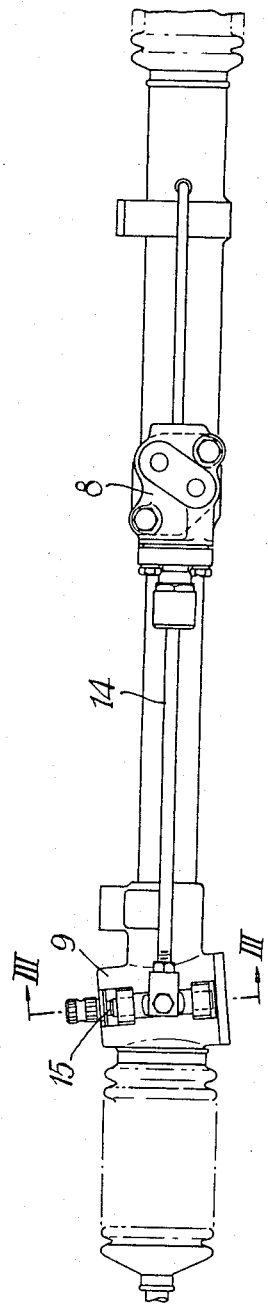
Figure 3:
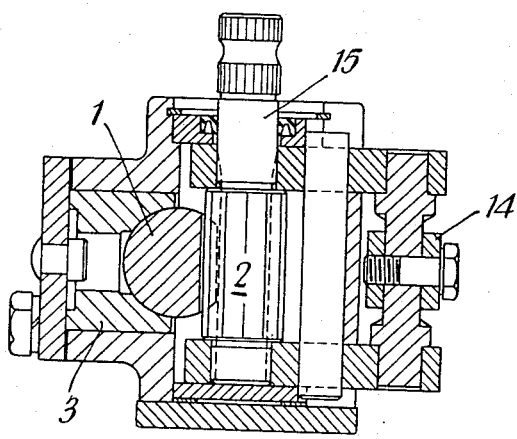
Figure 4:
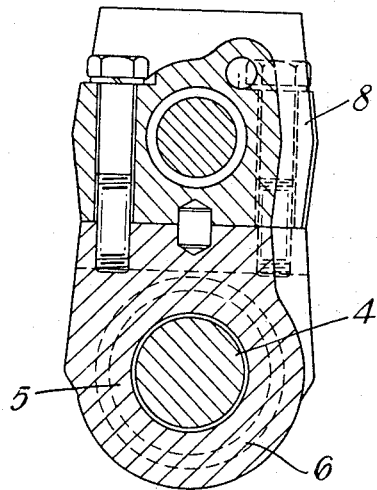

The invention will now be further described by way of example with reference to the accompanying drawings, in which:

FIGURE 1 is a sectional elevation of the mechanism;
FIGURE 2 is a plan view of the mechanism of FIGURE 1 shown on a smaller scale.
FIGURE 3 is a section taken on the line III–III of FIGURE 2;
FIGURE 4 is a section taken on the line IV—IV of FIGURE 1;
FIGURE 5 is a similar view to that of FIGURE 1 but showing a second embodiment of the invention; and
FIGURE 6 is a sectional elevation taken on the line VI—VI of FIGURE 5.

In the drawings illustrating the first embodiment, there is a rack 1 supported against a pinion 2 by a bearing saddle 3. The rack 1 is formed on a rod 4 which extends, through known connections, to the road wheels. The rod 4 carries at 5 a double-acting piston, sliding in a cylinder 6 through annular glands at 7 and appropriate bushes. It is to be assumed that hydraulic power-assist pressure operates on either side of the piston 5 directed to one side or the other by a valve assembly mounted on the cylinder 6 and generally indicated at 8.

There is a steering box 9 mounted on one end of an extension 6A of the cylinder 6, this box being anchored to the frame or chassis of the vehicle.

The steering box 9 has, borne in its wall at 10, a pivot pin 11, on which is fulcrumed a lever, part of which is seen at 12. The part seen at 12 projects from the box 9 and is connected by articular joints 13 to the valve assembly 8, through a rod 14. Inside the box 9, the lever is forked and in the lever-arm constituted by its internal forked part, is borne the pinion shaft 15 on which is the pinion 2 which engages the rack 1. Where the shaft 15 passes through the wall of the box 9, there is provided an adequately pliable or elastic sealing element such as a cup-washer or a so-called "boot," the purpose of which is to prevent leakage, but to allow the axis of the shaft 15 to shift transversely, in the wall of the box.

There may be spring-restraint within the box 9, to tend to neutralise the location of shaft 15; but it may suffice that within the valve unit 8 there is contained hydraulic or spring means to ensure neutralisation.

It is to be understood that the axis of shaft 15 swings about the axis of the fulcrum pivot 11, by reason of the reactions between the pinion 2 and rack 1. This means that the element 12 is a lever of the first kind; its arm above (in the drawing) the pivot 11, actuates the valve. Its arm below 15, is moved by the reaction between the rack and the pinion.

It is not clearly to be seen from the drawing but to be understood, that the axis of the pinion 15 may be (as is usual in rack-and-pinion steering mechanism) offset from the longitudinal axis of the rack and the bar 4.

As to dimensional terms, it is to be understood that the actual movement, between extremes of range, of the axis of the pinion 15, is within the range of thousandths of an inch and the valve unit is therefore provided to be responsive to one or other sense of direction, within such limits.

Referring now to FIGURES 5 and 6, in which the same reference numerals have been used throughout, these figures show a second embodiment of the invention in which some of the mechanical details are different. The valve assembly 8 is mounted on the cylinder extension 6A instead of on the cylinder 6 as in the embodiment previously described. This results in a considerable shortening of the rod 14. It will also be seen that the articular joint 13 at the outer end of the lever 12 is of different design and this joint is enclosed by a flexible boot 16. The bearing saddle 3 is urged against the rack 1 by a compression spring 17, adjustable by means of a screw 18 and a locknut 19.

The steering gear as a whole, that is to say the box, power assist piston and cylinder, and valve, are shown to be in a highly convenient and simple form, in a combination which lends itself to a unitary assembly in which problems of alignment and accurate relative dimensioning are minimised. The mechanism illustrated can be mounted in a vehicle as a unit, connected to hydraulic supply and drain, and connected (as to shaft 15) to the steering column, with extreme simplicity.

In a third modification (not illustrated) the fulcrum pivot is differently arranged. Instead of the pivot having the pin 11, the lever element has a partially spherical or partially cylindrical boss formed on it, which bears on a complementary spherical or cylindrical seat formed in a collar or bush which is located in the wall of the box 9, or a cap which forms part of the box. There may be also be provided (to prevent egress of lubricant and ingress of dirt) a flexible boot secured to the outside of the box and around the rod 14 so as to envelop the whole assembly of the points 13.

We claim:
1. Steering mechanism having a rack engaged by a pinion;
   a steering box through which passes said rack and in which said pinion is rotatably mounted;
   a shaft bearing said pinion and passing into said steering box;
   valve means for controlling hydraulic power assistance to said rack;
   a lever rocking on a pivot borne in the wall of said steering box and carrying said shaft; and
   connecting means between said lever and said valve means,
   the arrangement being such that the reaction between said rack and said pinion imparts a rocking movement to said lever so as to operate said valve means.
2. Steering mechanism according to claim 1, in which said rack is supported by a saddle against separation from said pinion, and in which yieldable means is provided between said shaft and said steering box so that movement of said shaft is permitted in a direction transverse to the axis of said shaft.
3. Steering mechanism according to claim 2, in which said pivot on which said lever rocks is located between the ends of said lever and in which one end of said lever is forked, said shaft being borne in said forked end.
4. Steering mechanism according to claim 3, in which said pivot is located on the side of said pinion remote from said rack.
5. Steering mechanism having a rod connected to steerable road wheels;
   a rack formed on said rod and engaged by a pinion;
   a cylinder enclosing part of said rod so as to form an annular space within which slides
   a double-acting piston attached to said part of said rod; and
   valve means for controlling the admission of hydraulic fluid on one or other side of said piston so as to provide hydraulic power assistance to said rod,
   the arrangement being such that the reaction between said rack and said pinion operates said valve means through the action of a rocking lever.
6. Steeering mechanism according to claim 5, comprising a body for said valve means, said body being rigid with said cylinder, and an articular connection between said valve means and said rocking lever.
7. Steering mechanism according to claim 6, in which said rocking lever is a lever of the first kind.

References Cited
UNITED STATES PATENTS

| | | | |
|---|---|---|---|
| 1,874,248 | 8/1932 | Davis | 74—388 |
| 2,565,929 | 8/1951 | Onde | 180—79.2 |
| 3,153,947 | 10/1964 | Adams | 74—498 |
| 3,205,984 | 9/1965 | Gomez | 74—388 |

DONLEY J. STOCKING, *Primary Examiner.*

L. H. GERIN, *Assistant Examiner.*